(12) United States Patent
Bhat et al.

(10) Patent No.: US 11,075,813 B2
(45) Date of Patent: Jul. 27, 2021

(54) PROACTIVELY DEPLOYING ANALYTICS TO A COMPUTERIZED EDGE DEVICE

(71) Applicant: Citrix Systems, Inc., Fort Lauderdale, FL (US)

(72) Inventors: Akshata Bhat, Bangaluru (IN); Anup Lal Gupta, Bangaluru (IN); James Bulpin, Cambridge (GB); Praveen Raja Dhanabalan, Bangaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 95 days.

(21) Appl. No.: 16/009,503

(22) Filed: Jun. 15, 2018

(65) Prior Publication Data

US 2019/0386883 A1    Dec. 19, 2019

(51) Int. Cl.

| G06F 15/167 | (2006.01) |
|---|---|
| H04L 12/24 | (2006.01) |
| H04L 29/08 | (2006.01) |
| H04L 12/26 | (2006.01) |

(52) U.S. Cl.
CPC .......... *H04L 41/14* (2013.01); *H04L 41/0803* (2013.01); *H04L 43/16* (2013.01); *H04L 67/2842* (2013.01); *H04L 67/12* (2013.01)

(58) Field of Classification Search
CPC ........................... H04L 41/14; H04L 67/2842
See application file for complete search history.

(56) References Cited

U.S. PATENT DOCUMENTS

| 8,701,010 | B2 | 4/2014 | Plamondon | |
|---|---|---|---|---|
| 8,868,753 | B2 | 10/2014 | Luna | |
| 8,977,755 | B2 | 3/2015 | Luna | |
| 9,444,752 | B2 | 9/2016 | Backholm | |
| 9,614,925 | B2 * | 4/2017 | Kowuri | ............... H04L 67/2842 |
| 9,817,789 | B2 | 11/2017 | Jain | |
| 9,979,796 | B1 * | 5/2018 | Yellin | ................. H04L 67/2847 |
| 2006/0176819 | A1 * | 8/2006 | Charzinski | .............. H04L 45/02 |
| | | | | 370/238 |

(Continued)

OTHER PUBLICATIONS

Flavio Bonomi, "Fog Computing and Its Role in the Internet of Things", MCC'12, Aug. 17, 2012 (Year: 2012).*

(Continued)

*Primary Examiner* — Kakali Chaki
*Assistant Examiner* — Su-Ting Chuang
(74) *Attorney, Agent, or Firm* — BainwoodHuang

(57) ABSTRACT

Techniques proactively deploy analytics to a computerized edge device. The techniques involve receiving data from the edge device. The data is conveyed through the edge device from a set of sensors disposed at a particular location. The techniques further involve performing analytics on the data to identify a set of edge device rules that defines a set of actions for the edge device to carry out under a set of predefined conditions potentially sensed by the set of sensors. The techniques further involve providing a command to the edge device. The command (i) includes the set of edge device rules and (ii) directs the edge device to, at a future time, start operating according to the set of edge device rules to protect against unsuccessful deployment of the command to the edge device due to subsequent delayed communication between the processing circuitry and the edge device.

22 Claims, 7 Drawing Sheets

(56) References Cited

U.S. PATENT DOCUMENTS

| | | | | |
|---|---|---|---|---|
| 2015/0006733 | A1* | 1/2015 | Khan | H04L 47/70 |
| | | | | 709/226 |
| 2015/0289176 | A1* | 10/2015 | Liu | H04W 24/02 |
| | | | | 370/331 |
| 2016/0300477 | A1* | 10/2016 | Pickford | G08B 25/10 |
| 2016/0366219 | A1* | 12/2016 | Ghana | H04L 67/1095 |
| 2017/0060574 | A1* | 3/2017 | Malladi | G06F 9/542 |
| 2017/0075910 | A1* | 3/2017 | Soto Matamala | H04L 43/106 |
| 2017/0191695 | A1* | 7/2017 | Bruhn | G05B 15/02 |
| 2018/0034715 | A1* | 2/2018 | Nagaraju | G06F 16/9038 |
| 2018/0097905 | A1* | 4/2018 | Todasco | H04L 67/2847 |

OTHER PUBLICATIONS

Yingjuan Shi, "The fog computing service for healthcare", 2015 2nd International Symposium on Future Information and Communication Technologies for Ubiquitous Healthcare (Year: 2015).*

* cited by examiner

PROACTIVELY DEPLOYING ANALYTICS TO A COMPUTERIZED EDGE DEVICE

BACKGROUND

There may be situations when a local computer communicates with a remotely located centralized computer. For example, a doctor visiting a patient at a hospital may wish to diagnose and/or obtain a recommended treatment for the patient using a local computer at the hospital and a centralized computer at a data center.

In one conventional approach, the centralized computer performs patient analysis. That is, the doctor sends patient information to the centralized computer through the local computer. The centralized computer then analyzes the patient information and sends a diagnosis and/or treatment back to the local computer. The doctor is then able to access the diagnosis and/or treatment from the local computer and treat the patient.

In another conventional approach, the local computer performs patient analysis. Here, the local computer initially is not properly provisioned to provide diagnosis and/or treatment services. Rather, the local computer receives particular patient information and provides that patient information to the centralized computer. The centralized computer then selects certain predefined medical guidelines based on the patient information, and configures the local computer to provide particular diagnosis and/or treatment services using the selected predefined medical guidelines. With the local computer now configured to perform appropriate patient analysis, the local computer then locally diagnoses and/or determines an appropriate treatment for the patient.

SUMMARY

Unfortunately, there are deficiencies to the above-described conventional approaches that use a local computer and a centralized computer. For example, the above-described conventional approaches rely on a consistently healthy communications channel (or link) between the local computer and the centralized computer. However, on occasion, the communications channel may become slow or flaky (e.g., due to an unexpected but temporary increase in network traffic, due to a storm or weather incident, due to a failover operation in response to failed network hardware, etc.). As a result, the communications between the local computer and the centralized computer may be interrupted temporarily or delayed (e.g., the local computer may need to wait half a minute or so to obtain a diagnosis or predefined guidelines to locally perform the diagnosis).

Accordingly, the above-described conventional approaches may be poorly suited for various situations such as monitoring a patient's vital signs in real-time and determining when to issue an alert indicating that the patient is in urgent need of care. For example, suppose that the centralized computer receives the patient's vital signs from the local computer and determines that the patient needs immediate care based on the vital signs. Further suppose that the centralized computer then attempts to send an alert message to the local computer informing the hospital that the patient needs immediate assistance. If the communications channel between the local computer and the centralized computer is unnecessarily delayed for even a few seconds, that critical time will be lost and the patient will suffer the consequences.

Similarly, suppose that the centralized computer receives the patient's vital signs from the local computer and selects certain predefined medical guidelines to send to the local computer to enable the local computer to perform diagnosis and/or determine treatment. Again, if the communications channel between the local computer and the centralized computer is unnecessarily delayed (even for a few seconds), the centralized computer will not be able to properly configure the local computer to provide diagnosis and/or treatment services right away and again critical time will be lost.

In contrast to the above-described conventional approaches which rely on constant healthy communications between the local computer and the centralized computer, improved techniques are directed to proactively deploying analytics from a central server to a computerized edge device thus preparing the computerized edge device to perform local analytics operations in the near future. That is, upon receipt of the analytics from the central server, the computerized edge device does not need to put the analytics into immediate action because the edge device can use other, previously received analytics to currently operate the system. Rather, the computerized edge device is able to schedule future use of the analytics (e.g., to start in five minutes, in 15 minutes, etc.). Accordingly, critical time is not lost if the communications are slow or flaky since there is not an immediate need for the analytics. Moreover, such proactively deployed or "pre-fetched" analytics may nevertheless be derived (i.e., generated dynamically) based on current or timely data rather than simply selected from predefined guidelines thus enabling actions by the computerized edge device to be more appropriate (e.g., tailored or customized to the current situational details). Since the proactively deployed analytics are up-to-date, any action determined by the computerized edge device is properly fitting for the current situation.

One embodiment is directed to a method of adapting operation of a computerized edge device. The method includes receiving, by processing circuitry, data from the computerized edge device. The data is conveyed to the processing circuitry through the computerized edge device from a set of sensors disposed at a particular location. The method further includes performing, by the processing circuitry, analytics on the data to identify a set of edge device rules that defines a set of edge device actions for the computerized edge device to carry out under a set of predefined conditions potentially sensed by the set of sensors disposed at the particular location. The method further includes providing, by the processing circuitry, a command to the computerized edge device. The command (i) includes the set of edge device rules and (ii) directs the computerized edge device to, at a future time, start operating in accordance with the set of edge device rules to protect against unsuccessful deployment of the command to the computerized edge device due to subsequent delayed communication between the processing circuitry and the computerized edge device.

In some arrangements, performing the analytics on the data to identify the set of edge device rules includes dynamically deriving a new edge device rule based on the data received from the computerized edge device.

In some arrangements, dynamically deriving the new edge device rule includes generating, as the new edge device rule, (i) a set of threshold criteria and (ii) an action based on applying analytics to the data. The command directs the computerized edge device to perform the action in response to detecting satisfaction of the set of threshold criteria at the particular location during a time window that starts a specified amount of time after the command is provided to the computerized edge device.

In some arrangements, providing the command to the computerized edge device occurs at a first time. Additionally, the command identifies (i) the specified amount of time and (ii) that the new edge device rule becomes effective after the computerized edge device receives the new edge device rule and waits the specified amount of time.

In some arrangements, the command directs the computerized edge device to replace an existing edge device rule with the new edge device rule after the computerized edge device receives the new edge device rule and waits the specified amount of time (e.g., five minutes, 10 minutes, 30 minutes, etc.).

In some arrangements, receiving the data from the computerized edge device includes acquiring, as the data, measurements that were sensed by the set of sensors and cached by the computerized edge device before being periodically transmitted to the processing circuitry through a computerized network.

In some arrangements, the measurements include a set of current values measured by the set of sensors and a location identifier that identifies the particular location among other different locations. Additionally, the method further includes providing other commands to other computerized edge devices residing at the other different locations to concurrently adapt operation of the other computerized edge devices residing at the other different locations.

In some arrangements, the set of threshold criteria defines an actionable range. Additionally, the new edge device rule specifies a particular action to be performed by the computerized edge device in response to the set of sensors indicating that a set of criteria sensed by the set of sensors currently falls within the actionable range defined by the set of threshold criteria.

In some arrangements, the action includes pre-fetching a set of electronic files from a file server and providing a human user that is currently using the computerized edge device with access to the set of electronic files.

In some arrangements, the action includes outputting an alert from the computerized edge device to alert a human at the particular location.

In some arrangements, the action includes shutting down a client device that is controlled by the computerized edge device.

In some arrangements, the action includes accessing a set of user preferences and adjusting operation of a client device that is controlled by the computerized edge device based on the set of user preferences.

In some arrangements, providing the command to the computerized edge device includes configuring the computerized edge device to wait at least five minutes after the computerized edge device receives the command before operating in accordance with the set of edge device rules.

In some arrangements, the method further includes, prior to receiving the data from the computerized edge device, creating a repository of information gathered from multiple computerized edge devices. The method also includes applying analytics to the repository of information to form a set of data structures representing predicted outcomes.

In some arrangements, deriving the new edge device rule includes, in response to satisfaction of a set of threshold criteria at the particular location during a future time window, generating, as the new edge device rule, an instruction to perform a particular action to address a possible predicted outcome formed by applying the analytics to the repository of information.

Another embodiment is directed to an electronic apparatus which includes a communications interface, memory, and control circuitry coupled to the communications interface and the memory. The memory stores instructions that, when carried out by the control circuitry, cause the control circuitry to:
 (A) receive data from the computerized edge device through the communications interface, the data being conveyed through the computerized edge device from a set of sensors disposed at a particular location,
 (B) perform analytics on the data to identify a set of edge device rules that defines a set of edge device actions for the computerized edge device to carry out under a set of predefined conditions potentially sensed by the set of sensors disposed at the particular location, and
 (C) provide a command to the computerized edge device through the communications interface, the command (i) including the set of edge device rules and (ii) directing the computerized edge device to, at a future time, start operating in accordance with the set of edge device rules to protect against unsuccessful deployment of the command to the computerized edge device due to subsequent delayed communication between the processing circuitry and the computerized edge device.

Yet another embodiment is directed to a computer program product having a non-transitory computer readable medium that stores a set of instructions to adapt operation of a computerized edge device. The set of instructions, when carried out by computerized circuitry, causes the computerized circuitry to perform a method of:
 (A) receiving data from the computerized edge device, the data being conveyed through the computerized edge device from a set of sensors disposed at a particular location;
 (B) performing analytics on the data to identify a set of edge device rules that defines a set of edge device actions for the computerized edge device to carry out under a set of predefined conditions potentially sensed by the set of sensors disposed at the particular location; and
 (C) providing a command to the computerized edge device, the command (i) including the set of edge device rules and (ii) directing the computerized edge device to, at a future time, start operating in accordance with the set of edge device rules to protect against unsuccessful deployment of the command to the computerized edge device due to subsequent delayed communication between the processing circuitry and the computerized edge device.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in proactively deploying analytics to a computerized edge device.

BRIEF DESCRIPTION OF THE DRAWINGS

The foregoing and other objects, features and advantages will be apparent from the following description of particular embodiments of the present disclosure, as illustrated in the accompanying drawings in which like reference characters

DETAILED DESCRIPTION

Overview

An improved technique is directed to proactively deploying or "pre-fetching" analytics from a central server to a computerized edge device thus preparing the computerized edge device to perform local analytics operations in the near future. That is, upon receipt of the analytics from the central server, the computerized edge device does not need to put the analytics into immediate action. Rather, the computerized edge device is able to schedule future use of the analytics (e.g., to start in five minutes, in 15 minutes, etc.). Accordingly, critical time is not lost if the communications between the central server and the computerized edge device are slow or flaky since there is not an immediate need for the analytics. Moreover, such deployed analytics may nevertheless be derived (i.e., generated dynamically) based on current or timely data rather than simply selected from pre-defined guidelines thus enabling actions by the computerized edge device to be more appropriate (e.g., tailored or customized to the current situational details). Since the proactively deployed analytics are up-to-date, any action determined by the computerized edge device is properly fitting for the current situation.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
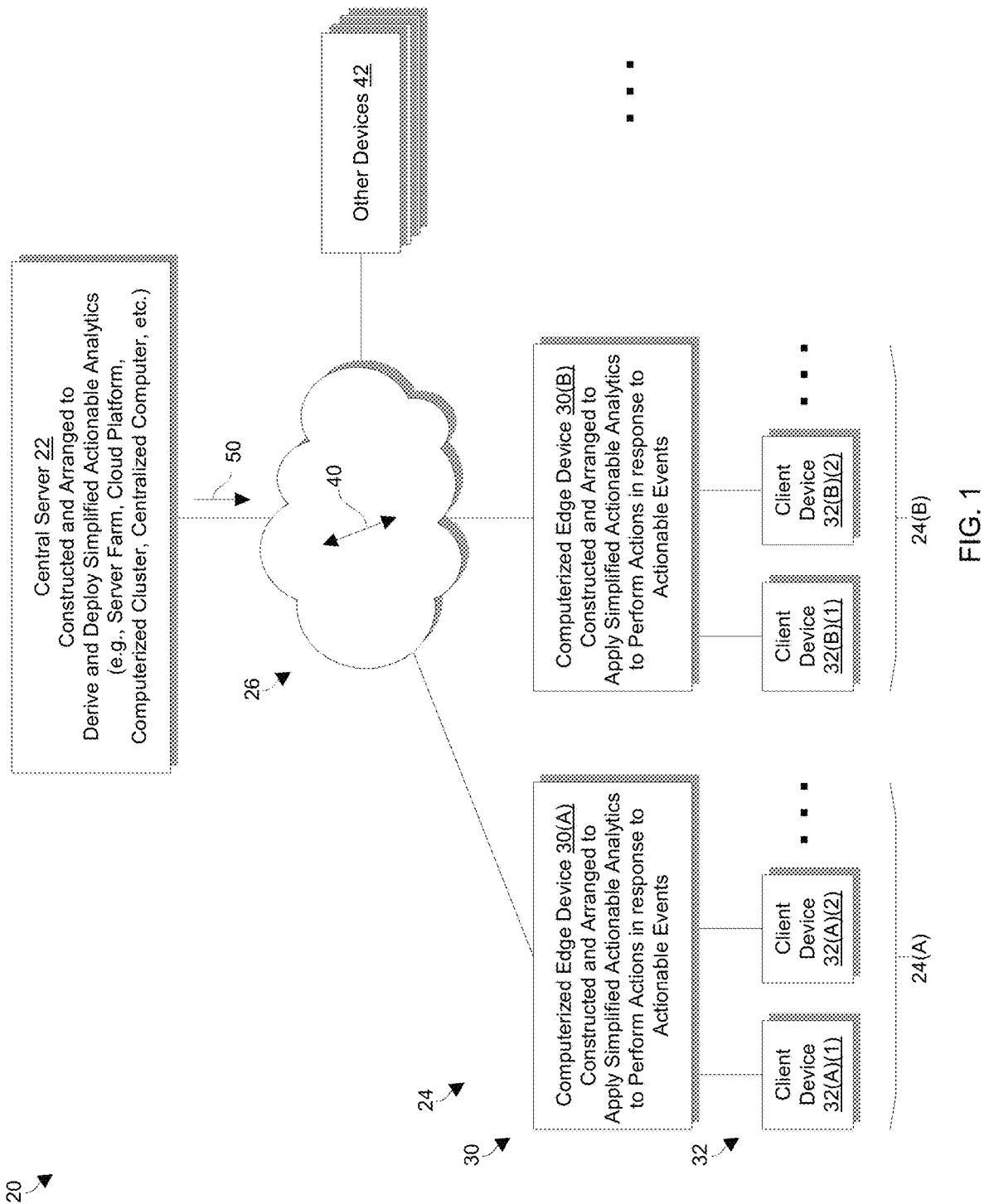
FIG. 1 is a block diagram of a computerized setting having a central server that proactively deploys analytics to computerized edge devices in accordance with certain embodiments.

FIG. 1 shows a computerized setting 20 having a central server that proactively deploys analytics to computerized edge devices. The computerized setting 20 includes a central server 22, branch equipment 24(A), 24(B), . . . (collectively, branch equipment 24), and communications medium 26.

The central server 22 is constructed and arranged to reliably and robustly provide simplified actionable analytics to the branch equipment 24 through the communications medium 26. In particular, the central server 22 collects data from the branch equipment (or simply branches) 24 over time, performs its own analytics to derive sets of edge device rules based on new incoming data in real-time, and deploys the sets of edge device rules to the branches 24 in a pre-fetched manner (i.e., proactively) before they are needed. Such rule derivation may employ various analytics techniques such as discovery and interpretation of statistical patterns, projection of likely or significant outcomes, etc. One should appreciate that the central server 26 benefits from collecting data from numerous branches 24 and is thus able to analyze situations, scenarios, etc. over a very large population. Furthermore, the central server 22 may employ machine learning, neural networks, statistical analysis, combinations thereof, and so on to identify trends, dependencies, criteria, probabilities, etc. among the data. Moreover, the central server 22 may be implemented in the form of a server farm, a cloud platform, a computerized cluster, a centralized computer, and so on to obtain certain benefits such as load balancing and fault tolerance.

Each branch 24 resides at a different location and includes a respective computerized edge device 30 and a respective group of client devices 32. For example, the branch 24(A) includes a computerized edge device 30(A) and a respective group of client devices 32(A)(1), 32(A)(2), . . . . Likewise, the branch 24(B) includes a computerized edge device 30(B) and a respective group of client devices 32(B)(1), 32(B)(2), . . . , and so on. It should be understood that the term "location" may be a geographical location such as a campus, a city, a coast, etc. Alternatively, "location" may have a different scope such as a room (or a floor, or a wing, etc.) in a particular building versus another room (or floor, or wing, etc.) in that same building, and so on.

Each branch 24 is constructed and arranged to sense local criteria and convey that local criteria to the central server 22. Additionally, each branch 24 is constructed and arranged to pre-fetch simplified actionable analytics derived by the central server 22 based on the local criteria (i.e., the edge device rules), and apply the pre-fetched simplified actionable analytics to new local criteria and thus perform useful work.

In some arrangements, the client devices 32 are thin clients with minimal resources (e.g., enough resources to sense local parameters, take measurements, tally occurrences of events, etc.). In these arrangements, the computerized edge devices 30 caches data from the client devices 32 (e.g., measurements, readings, counter values, etc.) and periodically transmits the cached data to the central server 22 in order to obtain smartly derived actionable analytics from the central server 22 and locally apply these analytics to new data to perform useful work.

The communications medium 26 is constructed and arranged to connect the various components of the computerized setting 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc.

Furthermore, the communications medium 26 is capable of supporting LAN-based communications, cellular communications, plain old telephone service (POTS) communications, combinations thereof, and so on.

It should be understood that the computerized setting 20 may include other devices 42 that do not necessarily participate directly in the overall operations performed by the central server 22 and the branches 24. Nevertheless, the other devices 42 may contribute network traffic and therefore affect latency for communications exchanged between the central server 22 and the branches 24. Furthermore, the other devices 42 may be a source of additional information (e.g., files, records, etc.) that is pre-fetched to the computerized edge devices 30.

During operation and in an ongoing manner, the client devices 32 collect data and report that data to their respective computerized edge devices 30. The computerized edge devices 30 cache (or buffer) that data and then convey the data to the central server 22.

Upon receipt of the data from the computerized edge devices 30, the central server 22 performs analytics on the data to identify patterns, trends, etc. During this time, the central server 22 derives sets of actionable rules 50 based on the data and proactively provides the sets of actionable rules 50 back to the computerized edge devices 30 in a pre-fetched manner.

When the computerized edge devices 30 receive the sets of actionable rules 50, the computerized edge devices 30 do not need to begin applying the sets of actionable rules 50 immediately. Rather, the sets of actionable rules are derived so they can be put into use in the future (e.g., 5 minutes after receipt, 15 minutes after receipt, etc.) and the computerized edge devices 30 can instead continue to use earlier received sets of actionable rules instead. Since the computerized edge devices 30 do not immediately need new sets of actionable rules 30 and instead can operate using earlier-received sets of actionable rules 30, if there are any communications delays in the communications medium 26, there is no impact on operation.

After the computerized edge devices 30 receive the new sets of actionable rules 50 and after some period of time passes (e.g., where the computerized edge devices 30 wait before putting the sets of rules 50 into action), the computerized edge devices 30 replace the earlier-used sets of rules 50 with the newly received sets of rules 50. Such rules 50 define actions to be taken by the computerized edge devices 30 in response to detection of particular conditions, events, etc. Further details will now be provided with reference to FIG. 2.

Figure 2:
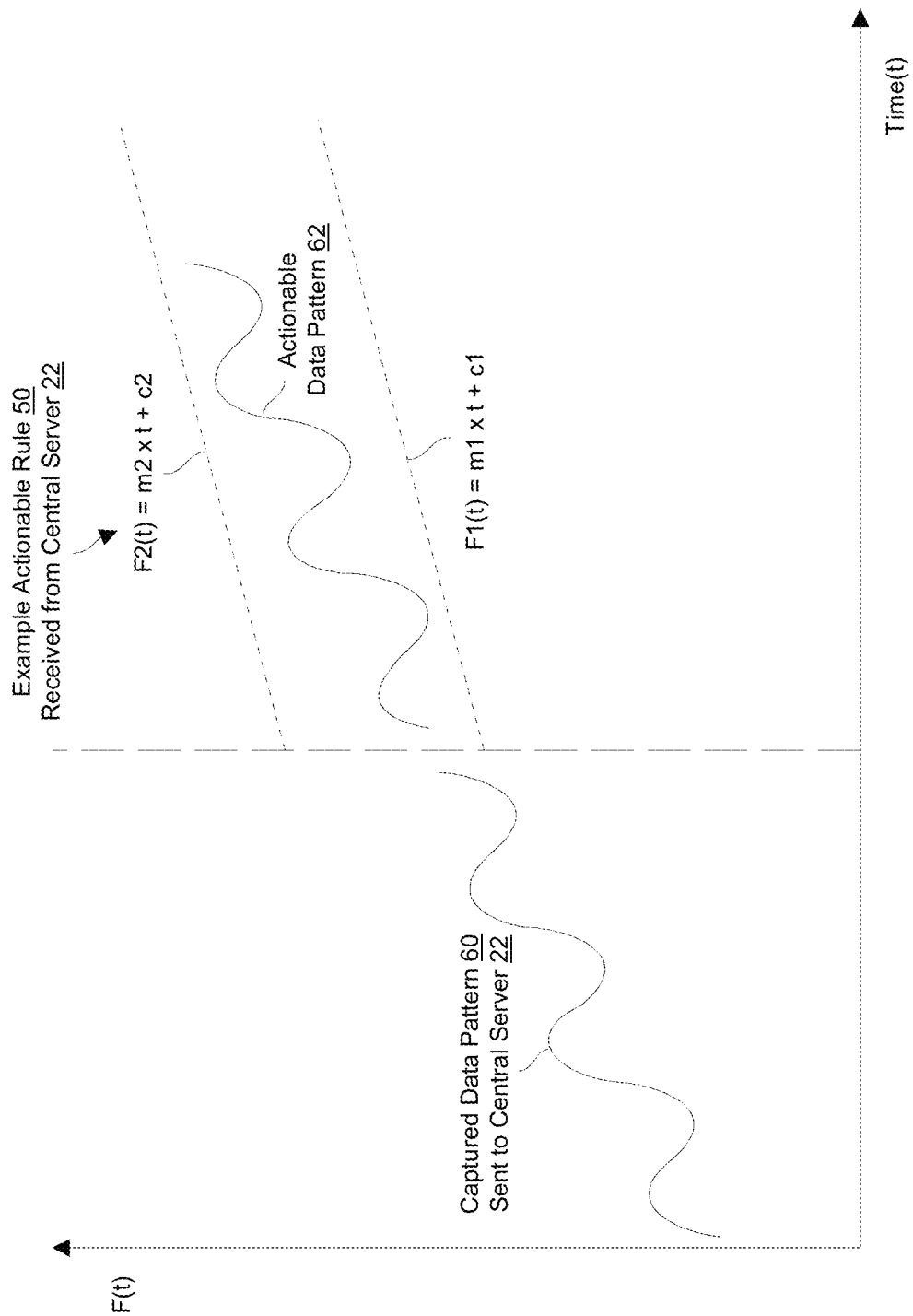
FIG. 2 is a graph illustrating particular details of a simplified actionable rule which is provided by the central server in accordance with certain embodiments.

FIG. 2 shows, by way of example only, a graph to illustrate particular details of a simplified actionable rule 50 which is provided by the central server 22 in accordance with certain embodiments. As shown in FIG. 2, the horizontal axis represents time (t), and the vertical axis represents outcomes (F(t)).

On the left side, client devices 32 capture/sense data at a particular location. Curve 60 represents a captured data pattern that is conveyed from a branch 24 to the central server 22 through the communications medium 26 (also see FIG. 1). In the context of a hospital room, the client devices 32 may include a heart rate monitor to measure a patient's heart rate, a thermometer to measure the patient's temperature, an oxygen level monitor to measure the level of oxygen in the patient's blood, and so on. Such data is collected by a computerized edge device 30 from the client devices 32, and relayed to the central server 22.

Upon receipt of the data by central server 22, the central server 22 applies analytics to determine a new set of actionable rules 50 for use by the computerized edge device 30. Along these lines, the central server 22 may decide that the new set of actionable rules 50 should be identical to an existing set of actionable rules 50 that is currently in use by the computerized edge device 30 (e.g., the analytics may expect to see no change in the patient's condition or improvement in the patient's condition). Alternatively, the central server 22 may decide that the new set of actionable rules 50 should be different than the existing set of actionable rules 50 that is currently in use by the computerized edge device 30 (e.g., the analytics may determine that the patient is not responding to treatment or that the patient's condition is deteriorating), and so on. Such analytics may require heavy computation, extensive data analysis, statistical analysis, machine learning, and so on and the central server 22 is well suited for performing such analytics.

Ultimately, the central server 22 proactively derives the new set of rules 50 based on the data and sends the new set of rules 50 to the computerized edge device 30 even though the computerized edge device 30 is not yet in need of the new set of rules 50. Upon receipt, the computerized edge device 30 schedules use of the new set of rules 50, e.g., sets the existing set of rules 50 to expire in X minutes and the new set of rules 50 to be enforced in X minutes.

On right side of the graph, the computerized edge device 30 continues to capture/sense data from a set of client devices 32 at the particular location. Curve 62 represents the current data pattern that is exhibited at the particular location.

As long as the data indicates that the current outcome F(t) is not within an actionable range, the computerized edge device 30 maintains its current operation (e.g., takes no action). However, if the current outcome F(t) matches certain actionable criteria, i.e., the current data pattern 62 falls within an actionable range, the computerized edge device 30 performs a particular action (or particular actions) associated with a particular rule 50.

By way of example only, the actionable ranges are defined using simple line equations:

$$F1(t) = m1 \times t + c1 \tag{1}$$

and $$F2(t) = m2 \times t + c2 \tag{2}.$$

In these equations, F1(t) and F2(t) identify particular actionable thresholds. It should be understood that more complicated sets of criteria are suitable for use as well.

Using equations (1) and (2) above, a suitable format for an actionable rule 50 is:

If (F1(t)>m1×t+c1) or (F2(t)<m2×t+c2),
then perform Action_X.

Here, the actionable rule 50 includes a set of threshold criteria and an action based on applying analytics to the data. In the example, F1(t)>m1×t+c1 and F2(t)<m2×t+c2 define the threshold criteria, and Action_X is the action. Other rule formats are suitable for use as well. Further details will now be provided with reference to FIG. 3.

Figure 3:
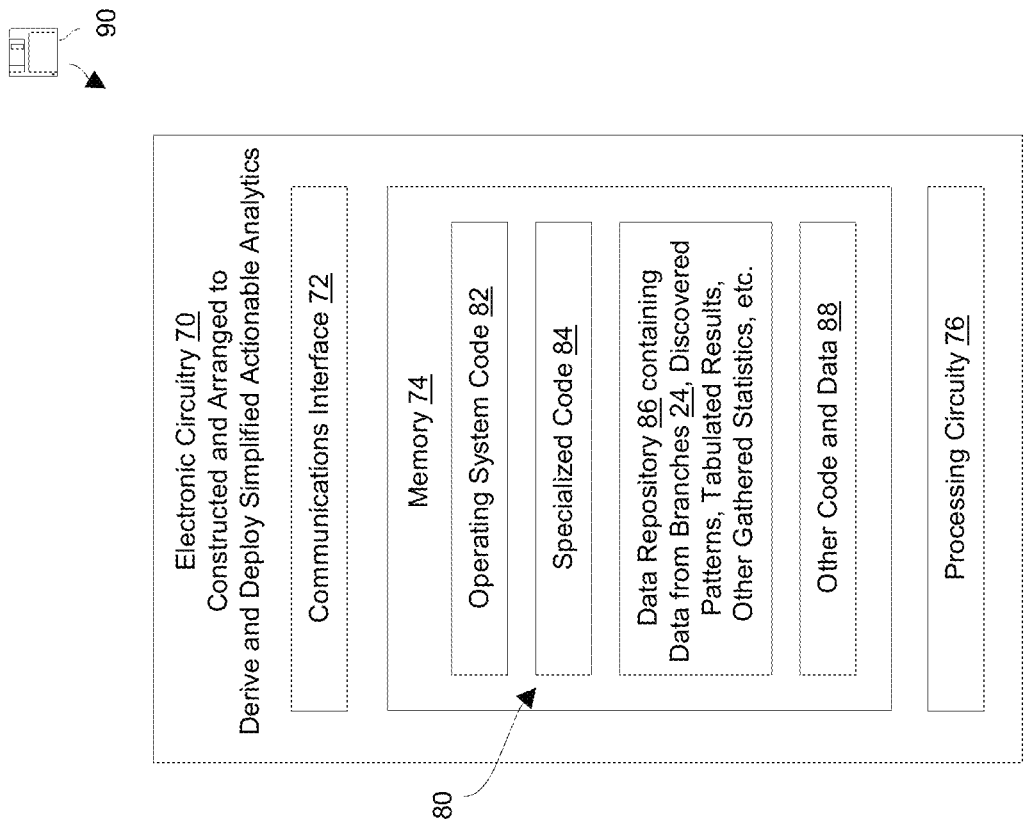
FIG. 3 is a block diagram of electronic circuitry that is suitable for use for at least some of the central server in accordance with certain embodiments.

FIG. 3 shows electronic circuitry 70 that is suitable for use for at least a portion of the central server 22 in accordance with certain embodiments. The electronic circuitry 70 includes a communications interface 72, memory 74, and processing circuitry 76.

The communications interface 72 is constructed and arranged to connect the electronic circuitry 70 to the communications medium 26 (FIG. 1). Accordingly, the communications interface 72 enables the electronic circuitry 70 to communicate with the other components of the computerized setting 20. Such communications may be line-based, wireless, combinations thereof, and so on. Moreover such communications may utilize a variety of protocols (e.g., IP, cellular, fiber optic, RF, etc.).

The memory 74 is intended to represent both volatile storage (e.g., DRAM, SRAM, etc.) and non-volatile storage (e.g., flash memory, magnetic disk drives, etc.). The memory 74 stores a variety of software constructs 80 including an operating system 82, specialized analytics applications and data 84, a data repository 86 containing data collected from multiple branches 24, and other applications and data 88.

The processing circuitry 76 is constructed and arranged to operate in accordance with the various software constructs 80 stored in the memory 74. In particular, the processing circuitry 76, when executing the operating system 82, manages various resources of the electronic circuitry 70 (e.g., memory allocation, processor cycles, hardware compatibility, etc.).

Additionally, the processing circuitry 76 operating in accordance with the specialized analytics applications and data 84 forms specialized control circuitry to derive sets of actionable rules 50 for the various branches 24 based on analytics using the data repository 86 (i.e., a collection of data from multiple different branches 24). Furthermore, the processing circuitry 74 operating in accordance with the other applications and data 88 forms other specialized circuitry to provide commands to the various branches 24 that effectively proactively distribute the sets of actionable rules 50 in a pre-fetched manner.

It should be understood that the above-mentioned processing circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic circuitry 70. The computer program product 90 has a non-transitory and non-volatile computer readable medium that stores a set of instructions to control one or more operations of the electronic circuitry 70. Examples of suitable computer readable storage media include tangible articles of manufacture and apparatus that store instructions in a non-volatile manner such as CD-ROM, flash memory, disk memory, tape memory, and the like.

During operation, the electronic circuitry 70 adapts the operation of multiple branches 24 in an ongoing manner to carry out the earlier-described responsibilities of the central server 22 (FIG. 1). In particular, the electronic circuitry 70 receives data from the branches 24, generates sets of actionable rules 50 based on the data, and proactively deploys the set of actionable rules 24 (e.g., as simplified analytics via commands from the electronic circuitry 70) to the branches 24 in a pre-fetching manner. With the set of actionable rules 50, the computerized edge devices 30 of the branches 24 are able to configure themselves to apply the sets of actionable rules 50 at a time in the future (e.g., in five minutes). The time may be a predefined amount of time in the future, a specified absolute time in the future, a specified future time window or range, etc. As a result, the operation of the computerized edge devices 30 is not impeded by a delay in the communications medium 26. Such operation essentially extends the reach of analytics to the edge devices 30.

It should be understood that the ability of the computerized setting 20 to withstand delays in the communications medium 26 makes the computerized setting 20 well suited for certain types of situations that are sensitive to communication delays. For example, the computerized setting 20 is well suited for patient monitoring situations in which local hardware receives pre-fetched actionable rules 50 and then applies the pre-fetched actionable rules 50 at a future time to oversee a patient. As another example, the computerized setting 20 is well suited for work hub situations in which local hardware receives pre-fetched actionable rules 50 and then applies the pre-fetched actionable rules 50 at a future time to customize user preferences in order to improve the user experience in various locations, e.g., a conference room, an office, a laboratory, etc. Further details will now be provided with reference to FIGS. 4 and 5.

Figure 4:
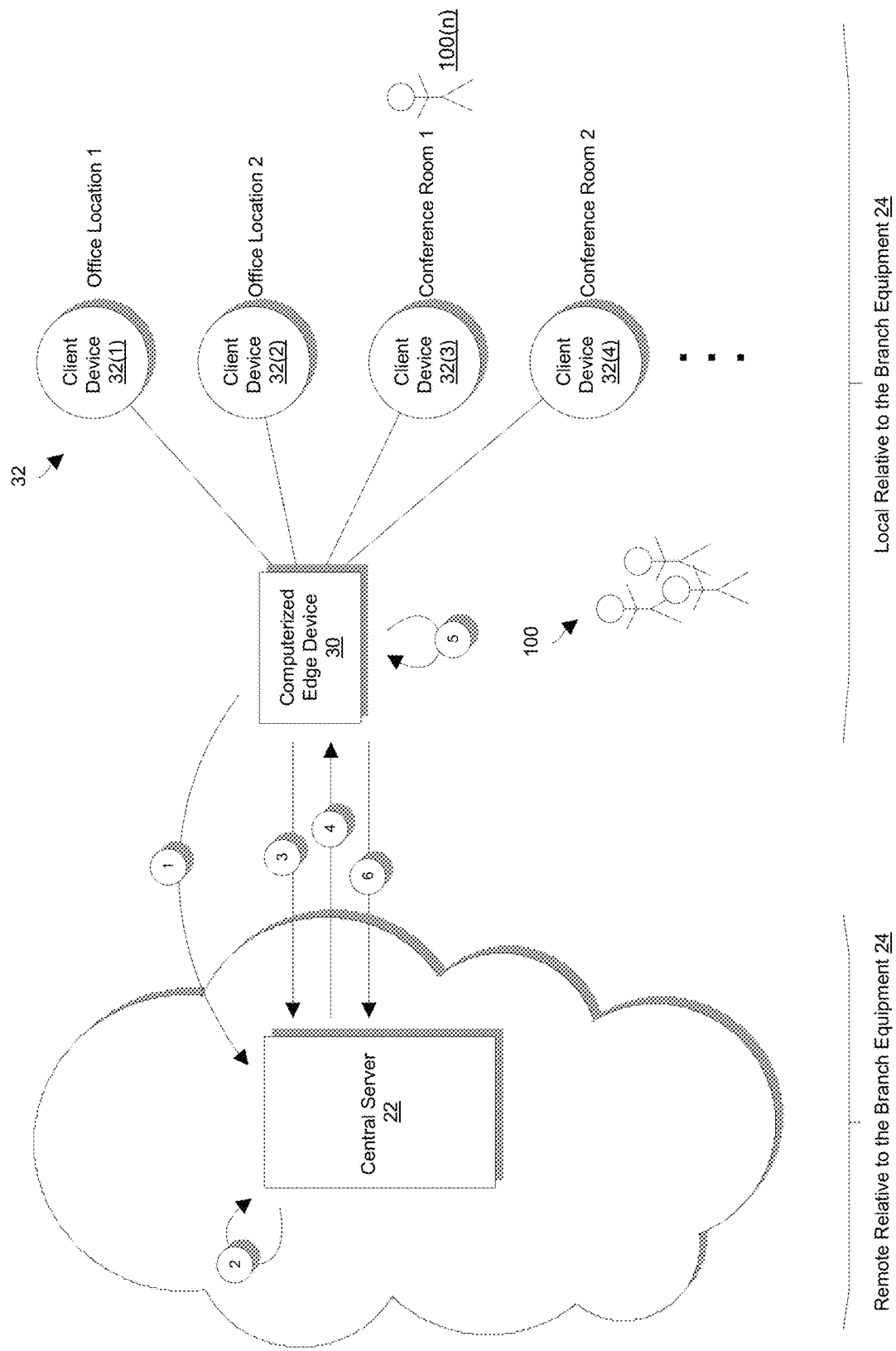
FIG. 4 is a block diagram illustrating an example use case for the computerized setting of FIG. 1.
Figure 5:
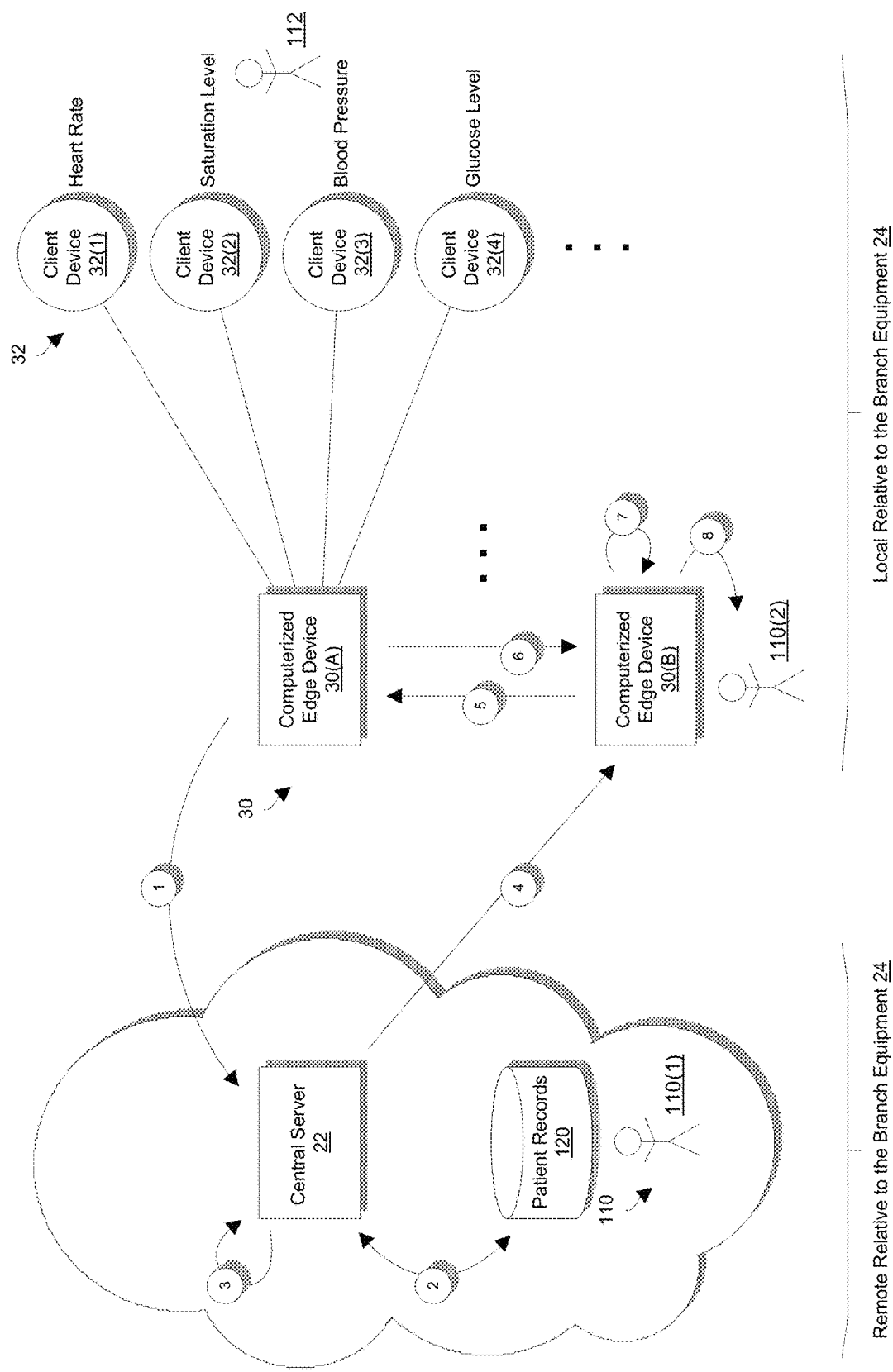
FIG. 5 is a block diagram illustrating another example use case for the computerized setting of FIG. 1.

FIGS. 4 and 5 show different example use cases for the computerized setting 20. FIG. 4 illustrates an office example use case in accordance with certain embodiments. FIG. 5 illustrates a hospital example use case in accordance with certain embodiments.

Work Hub Example

As shown in the office example depicted in FIG. 4, the branch equipment 24 at a particular location includes a computerized edge device 30 and multiple client devices 32(1), 32(2), 32(3), 32(4), . . . (collectively, client devices 32). By way of example, the particular location may be an office building, a corporate campus, or similar office space setting. Here, the computerized edge device 30 (or work hub) may be a company server, an office server, a workstation, dedicated equipment, or similar apparatus that is configured to cache and convey data from the client devices 32 to the central server 22 as well as pre-fetch actionable rules 50 from the central server 22 and apply the actionable rules 50 to perform actions at the particular location.

Each client device 32 is constructed and arranged to collect and send data to the computerized edge device 30, and may be under control of the computerized edge device 30. In this office example, the client devices 32 are configured to detect information such as the current locations of human users 100 as the human users 100 move between different office areas, user preferences and control settings for various computerized equipment, user behavior and habits, and so on. Various types of client devices 32 are suitable for use such as lighting control (e.g., display brightness/resolution, smart dimmers, etc.), speaker volumes, specialized applications that are loaded onto particular computers within the office space, data communications devices (e.g., routers, switches, IP phones, RF readers, proximity sensors, etc.), other Internet of Things (IoT) devices, combinations thereof, and so on.

In this example, the central server 22 is constructed and arranged to gather and analyze the data from multiple office branches 24. In particular, using analytics, the central server 22 is able to discern trends, styles of behavior, etc. and infer or project future user preferences and needs. As a result, the central server 22 can proactively derive commands containing actionable rules 50 and effective valid times for the actionable rules and send the commands to the computerized edge devices 30 of the branches 24 in a pre-fetched manner so that subsequent communications delays have no impact on operation (also see FIG. 1).

In accordance with the office example, the client devices 32 sense user activity in an ongoing manner. For example, the client device 32(1) may reside in a particular office that is routinely accessed by a particular user 100($n$), the client device 32(2) may reside in another office that is occasionally accessed by the particular user 100($n$), the client device 32(3) may reside in a particular conference room that is often used by the particular user 100($n$), the client device 32(4) may reside in another conference room that is somewhat used by the particular user 100($n$), and so on. Over time, these client devices 32 send user preferences to the computerized edge device 30. Such data reporting may occur from the client devices 32 at the same time or at different times.

The computerized edge device 30 conveys the data to the central server 22 (arrow 1 in FIG. 4). In some arrangements, the computerized edge device 30 immediately forwards the data to the central server 22. In other arrangements, the computerized edge device 30 caches the data and periodically forwards the data to the central server 22. With the data having been received by the central server 22, the central server 22 performs analytics to understand the user's preferences (arrow 2). Along these lines, the central server 22 may include the data with other accumulated data from the same user 100(*n*) and/or other users 100 (also see the data repository 86 in FIG. 3). In some arrangements, the central server 22 maintains a user profile for each user 100 and updates the user profile based on the analytics. Additionally, the central server 22 generates a new set of actionable rules 50 that are to become effective at some well-defined time in the future (e.g., in 5 minutes, in 10 minutes, in 30 minutes, etc.).

At some point, the computerized edge device 30 informs the central server 22 that the user 100(*n*) is in a particular location (see arrow 3). For example, the computerized edge device 30 may have detected that the user 100(*n*) has scheduled use of a particular meeting room that is equipped with a projector, a system for recording meetings, smart lighting, and so on. Before the scheduled meeting (e.g., 30 minutes before the identified meeting time), the computerized edge device 30 sends a message to the central server 22 to pre-fetch user preferences for the user 100(*n*).

As an alternative to an event driven request for the new set of actionable rules 50, the central server 22 may periodically send new sets of actionable rules 50 to the computerized edge device 30. Such operation may be driven by an internal clock or schedule at the central server 22.

The central server 22 responds by sending a command (arrow 4) to the computerized edge device 30 containing a new set of actionable rules 50 that directs the computerized edge device 30 to perform one or more actions in response to detecting satisfaction of the set of threshold criteria at the particular location during a time window that starts in the future (e.g., shortly before the scheduled meeting time). It should be understood that the new set of actionable rules 50 has been derived from the most current information received from the computerized edge device 30 and is based on data from the particular branch 24 and perhaps other different branches (i.e., a wide population). Thus, the new sets of actionable rules 50 is superior to predefine guidelines that might be used in a conventional approach to customizing a meeting.

Upon receipt of the command, the computerized edge device 30 schedules when the new set of actionable rules 50 will be effective. For example, the computerized edge device 30 may begin applying the new set of actionable rules 50 fifteen (15) minutes before the scheduled start time of the meeting.

Once the computerized edge device 30 begins applying the new set of actionable rules 50 (arrow 5), the computerized edge device 30 compares current data from the client devices 32 to the sets of threshold criteria defined in the rules 50 to determine whether there are any matches (also see FIG. 2). For example, a particular client device 32 may detect that the user 100(*n*) has entered the meeting room or has activated a computer in the meeting room. In response, the computerized edge device 30 discovers a match with one or more actionable rules 50 and performed the defined actions, e.g., loads particular meeting applications onto the computer for use by the user 100(*n*), dims the lights according to the user's preference, and so on. Such actions thus improve the user's experience in an automated and effective manner. Moreover, because the rules 50 were pre-fetched ahead of time, the user experience did not suffer due to any delays in communications between the central server 22 and the computerized edge device 30.

Also, the computerized edge device 30 provides the central server 22 with a summary of the actions/preferences taken by the user 100(*n*) during the meeting (e.g., length of the meeting, applications used, display resolution, volume settings, etc.). Accordingly, the central server 22 in combination with the computerized edge device 30 are able to continue the process of improving the user experience based on current data and up to date analytics.

Hospital Workspace

In a hospital workspace example depicted in FIG. 5, the branch equipment 24 at a particular location includes multiple computerized edge devices 30(A), 30(B) (collectively, edge devices 30) and multiple client devices 32(1), 32(2), 32(3), 32(4), . . . (collectively, client devices 32). By way of example, the particular location is a hospital or similar medical facility. Here, each computerized edge device 30 may be a hospital server, a doctor's workstation, specialized equipment, or similar apparatus that is configured to cache and convey data from the client devices 32 to the central server 22 as well as pre-fetch actionable rules 50 from the central server 22 and apply the actionable rules 50 to perform actions at the particular location.

Each client device 32 is constructed and arranged to collect and send data to the computerized edge device 30. In this hospital workspace example, the client devices 32 are configured to detect information such as the current locations of various doctors or other medical personnel 110 as they visit different patients, vital signs of a particular patient 112, and so on. Various types of client devices 32 are suitable for use such as a heart rate monitor, a saturation level sensor, a blood pressure sensor, a glucose level meter, other Internet of Things (IoT) devices, combinations thereof, and so on.

In this example, the central server 22 is constructed and arranged to gather and analyze the data from multiple medical branches 24. In particular, using analytics, the central server 22 is able to discern trends, patient responses, etc. and infer or project future patient behavior. As a result, the central server 22 can proactively derive commands containing actionable rules 50 and effective valid times for the actionable rules and send the commands to the computerized edge devices 30 of the branches 24 in a pre-fetched manner so that subsequent communications delays have no impact on operation (also see FIG. 1).

In accordance with the hospital workspace example, the client devices 32 gather and report patient information in an ongoing manner. For example, the client device 32(1) may be a heart rate monitor, the client device 32(2) may be a saturation level sensor, the client device 32(3) may be a blood pressure sensor, the client device 32(4) may be a glucose level meter, and so on. Over time, these client devices 32 send patient data to the computerized edge device 30(A) which may be a dedicated device assigned to the particular patient 112. Such data reporting may occur from the client devices 32 at the same time or at different times.

The computerized edge device 30(A) conveys the data to the central server 22 (arrow 1 in FIG. 5). In some arrangements, the computerized edge device 30(A) immediately forwards the data to the central server 22. In other arrangements, the computerized edge device 30(A) caches the data and periodically forwards the data to the central server 22.

With the data having been received by the central server 22, the central server 22 retrieves existing patient records 120 (arrow 2) maintained by a first doctor 110(1) who may not be able to visit the patient 112 at the hospital. The central server 22 may include the existing patient records 120 with other accumulated patient data from the same patient 112 and/or other patients 112 (also see the data repository 86 in FIG. 3).

Next, the central server 22 performs analytics operations on the data which includes the patient's current vital signs, the patient's record 120, and other medical data (arrow 3). For example, the central server 22 may derive a set of actionable rules 50 to generally diagnose and/or identify treatment. Additionally, the central server 22 may derive a set of actionable rules 50 to locally perform anomaly detection and infer a set of expected vital signs for the patient 112 in the future based on the results of such anomaly detection.

Then, the central server 22 sends a command to the computerized edge device 30(B) which is operated by another doctor 110(2) at the hospital (arrow 4). The command directs the computerized edge device 30(B) to support the other doctor 110(2) in his/her efforts to care for the patient 112. For example, the command includes a model, the patient's record from the first doctor 110(1), and the set of actionable rules 50. It should be understood that central server 22 provides the command to the computerized edge device 30(B) in a pre-fetched manner before the support by the other doctor 110(2) is needed (e.g., the other doctor 110(2) may be visiting other patients and moving towards visiting the current patient 112).

Subsequently, the computerized edge devices 30(A), 30(B) collaboratively carry out an exchange. In particular, the computerized edge devices 30(A), 30(B) coordinate operation in expectation of the other doctor visiting the patient in a few minutes (e.g., 15 minutes, 30 minutes, etc.). Accordingly, the computerized edge devices 30(A), 30(B) essentially forms and operates as a single computerized edge device 30 and thus may be considered one computerized edge device 30.

Along these lines, the computerized edge device 30(B) connects to the computerized edge device 30(A) (i.e., the patient's device) (arrow 5). Once the connection is established, the computerized edge device 30(A) starts sending current patient data to the computerized edge device 30(B) (i.e., the other doctor's computer) (arrow 6). Then, using the model, the computerized edge device 30(B) monitors the patient data in real time by locally applying analytics in the form of using the simplified actionable rules 50 (arrow 7). Accordingly, the computerized edge device 30(B) is able to detect an anomaly and notify the other doctor 110(2) not only with insights but also with the patient's record (arrow 8).

Further Details

Figure 6:
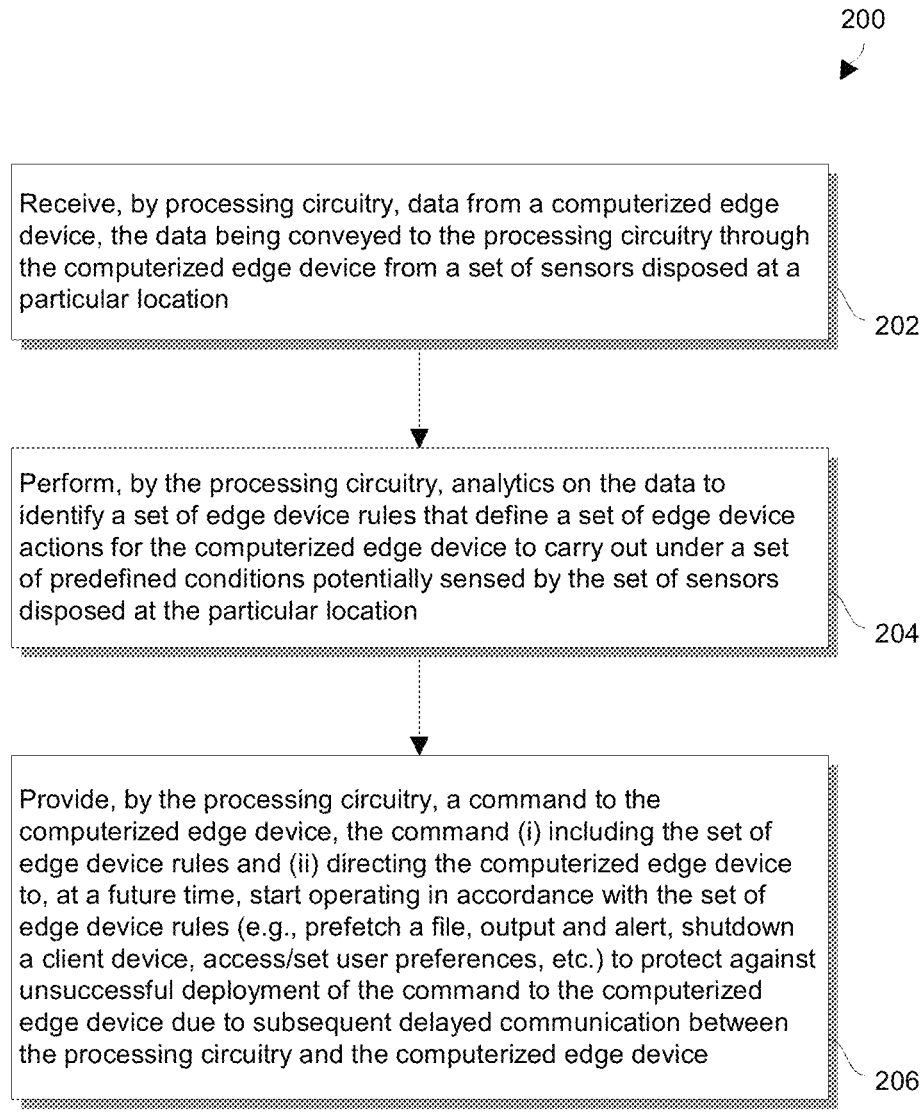
FIG. 6 is a flowchart of a procedure that is performed by the central server during operation.

FIG. 6 is a flowchart of a procedure 200 that is performed by the central server 22 during operation (also see FIG. 1). Such operation proactively deploys custom-derived analytics to a computerized edge device.

At 202, processing circuitry of the central server receives data from the computerized edge device. The data is conveyed to the processing circuitry through the computerized edge device from a set of sensors disposed at a particular location.

At 204, the processing circuitry performs analytics on the data to identify a set of edge device rules that defines a set of edge device actions for the computerized edge device to carry out under a set of predefined conditions potentially sensed by the set of sensors disposed at the particular location. To this end, the processing circuitry dynamically derives at least one new edge device rule based on the data received from the computerized edge device (also see FIG. 2). In particular, the processing circuitry provides a command which includes a set of threshold criteria and an action that the computerized edge device performs if new data at the particular location matches the set of threshold criteria. The command may also identify a future time when the new edge device rule is valid.

At 206, the processing circuitry provides a command to the computerized edge device. The command (i) includes the set of edge device rules and (ii) directs the computerized edge device to, at a future time, start operating in accordance with the set of edge device rules to protect against unsuccessful deployment of the command to the computerized edge device due to subsequent delayed communication between the processing circuitry and the computerized edge device. Example actions include pre-fetching a set of electronic files from a file server and providing a human user that is currently using the computerized edge device with access to the set of electronic files, outputting an alert from the computerized edge device to alert a human at the particular location, shutting down a client device that is controlled by the computerized edge device, accessing a set of user preferences and adjusting operation of a client device that is controlled by the computerized edge device based on the set of user preferences, among others.

Figure 7:
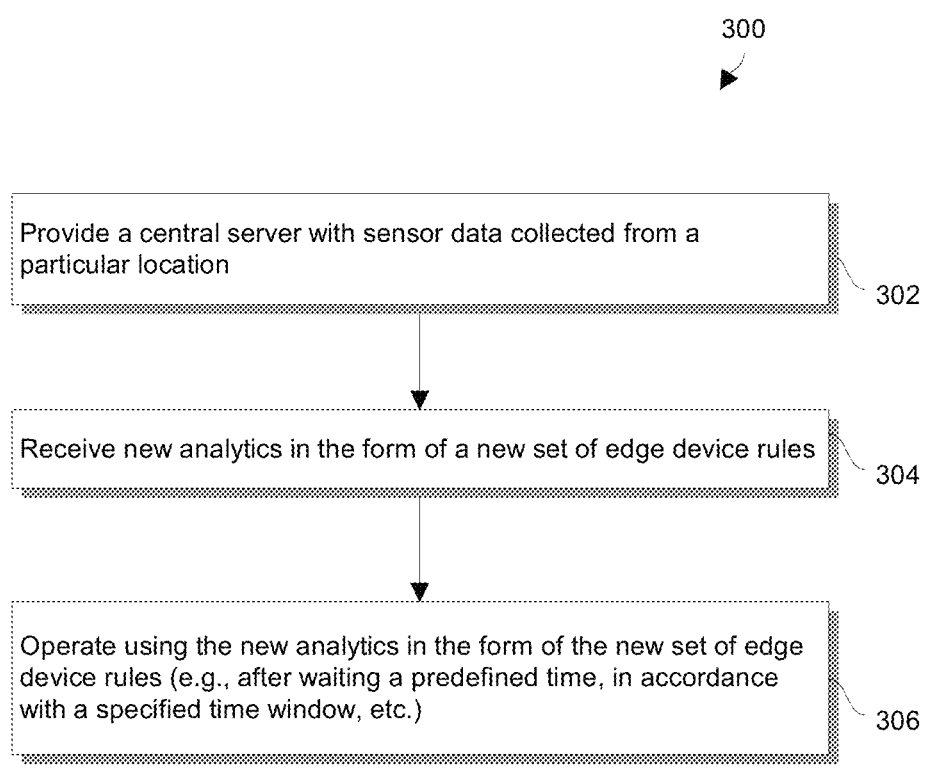
FIG. 7 is a flowchart of a procedure that is performed by a computerized edge device 30 in accordance with certain embodiments.

FIG. 7 is a flowchart of a procedure 300 that is performed by a computerized edge device 30 in accordance with certain embodiments. Such a procedure 300 protects against subsequent delays in communications between the computerized edge device 30 and the central server 22.

At 302, the computerized edge device 30 provides the central server 22 with sensor data collected from a particular location. In the context of a hospital example, the sensor data may identify vital signs of a particular patient. In the context of an office setting, the sensor data may identify who is present and what equipment is available in a particular office or conference room.

At 304, the computerized edge device 30 receives new analytics in the form of a new set of edge device rules 50. As described above, the new set of edge device rules 50 may have been derived dynamically based on the sensor data. In the context of the hospital example, the set of edge device rules 50 may control when to provide a notification or alert under certain patient conditions. In the context of the office setting, the set of edge device rules 50 may control when to employ certain computerized user preferences on local office equipment, etc. It should be understood that the computerized edge device 30 does not yet need the new set of edge device rules 50 and may be appropriately operating using an earlier-received set of edge device rules 50.

At 306, the computerized edge device 30 operates using the new analytics in the form of the new set of edge device rules 50. Such operation may begin after a generous amount of time has passed since computerized edge device 30 received the new set of edge device rules 50 (e.g., after waiting a predefined time, in accordance with a specified time window, etc.). Accordingly, subsequent delays in communications between the computerized edge device 30 and the central server 22 do not interfere with the ability of the computerized edge device 30 to begin use of the new set of edge device rules 50.

As described above, improved techniques are directed to proactively deploying analytics from a central server 22 to a computerized edge device 30 thus preparing the computerized edge device 30 to perform local analytics operations in the near future. That is, upon receipt of the analytics from the central server 22, the computerized edge device 30 does not need to put the analytics into immediate action. Rather, the computerized edge device 30 is able to schedule future use of the analytics (e.g., to start in five minutes, in 15 minutes, etc.). Accordingly, critical time is not lost if the communications are slow or flaky since there is not an immediate need for the analytics. Moreover, such proactively deployed or "pre-fetched" analytics may nevertheless be derived (i.e., generated dynamically) based on current or timely data rather than simply selected from predefined guidelines thus enabling actions by the computerized edge device 30 to be more appropriate (e.g., tailored or customized to the current situational details). Since the proactively deployed analytics are up-to-date, any action determined by the computerized edge device is properly fitting for the current situation.

Additionally, one should appreciate that this above-described techniques amount to more than simply providing performing routine tasks using a computer. Rather, the techniques involve an improvement to the technology of distributed computer system. In particular, equipment that is separated via communications channels is susceptible to delays, interruptions, etc. and thus may be unreliable in certain situations. However, by proactively delivering actionable rules in a pre-fetched manner, there is no impact if communications are subsequently delayed. Moreover, the actionable rules are derived based on analytics and thus essentially extend the power of such analytics to the edge device via application of simple actionable rules where the edge device carries out actions in response to data received from client devices that matches criteria of the actionable rules.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the central server 22 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

One should appreciate that, in conventional situations, the position of an analytics service is not very close to IoT devices (ex: in cloud) and in many cases, a delay of few seconds in delivering actions to IoT deployment is inevitable. Such a delay can make a significant difference in case of mission-critical changes in IoT environment since these type of variations in an IoT set-up require immediate action.

However, as disclosed herein and in accordance with certain embodiments, an intelligent mechanism is provided to pre-fetch simplified actionable analytics to the edge devices. Such actionable analytics may be derived from a centrally hosted analytics service that is capable of solving a local simplified analytic problem (pertaining to the edge) as well as provide a quick response.

Every IoT deployment may require close monitoring and analytics for continued operation and secure functioning. In a generic IoT setup, IoT devices are connected to an edge node or a broker, which facilitates communication across all connected devices. The edge node also sends monitoring data to a centralized analytics service, which is a unified console for an administrator to monitor and manage. This analytics service is capable of triggering an action such as shutting down a device, upgrade it or isolate it from the network if any malicious activity is suspected.

In general scenarios, the position of the centralized service is not very close to edge nodes and in many cases, a delay of few seconds in delivering actions to the edge nodes or brokers is inevitable. Further, the communications channel between the edge nodes and the centralized service could be unreliable. This delay/reliability can make a significant difference in case of mission-critical changes in IoT environment. These type of variations in an IoT set-up require immediate action.

On the other hand, an IoT device being resource constraint does not have enough resources to run an anomaly detection algorithm. Accordingly, the IoT device relies on an external analytics service to send actions based on analytics. Furthermore, the edge node may not have enough storage to maintain historical usage pattern of all devices, hence will not be able to identify the sudden increase in data usage as a potential security risk. Thus, the central analytics service may be the place to detect anomalies but it is quite possible that as soon as an action is delivered to the broker, significant harm has been dealt.

One should further appreciate that there are many possible circumstances where it's difficult to maintain connectivity with a centralized service. For instance, during a storm, connectivity may be easily lost.

Furthermore, in some cases, pre-configured rules at a broker/edge device can also serve the purpose, but the use cases are extremely limited. In particular, the resource constraints at any IoT deployment, an administrator can configure static rules only. Accordingly, the opportunity to customize or tailor operation to a specific dataset is lost. Rather, with the pre-configured rules, the rules are limited to the direct value of a single counter or some simple computation on direct counter values.

In contrast, a centralized analytics service is able to derive complex insights using multiple counters across the devices. In general, the actionable insights are not directly driven from a single counter. Therefore, it makes sense for a broker to rely on analytics service to supply with actions. The analytics service can use dynamic rules as an efficient way to deliver potentially probable actions, which will help to mask the delays between the service and brokers.

In the context of a smart office environment (e.g., provisioned with a work hub and/or smart conferencing system), a smart conferencing room may be provisioned with equipment such as a local PC, a phone system, additional IoT devices, and the resources they are managing. With this infrastructure in place, the improvements disclosed herein alleviate the need for unnecessary transmission of information to and from the cloud, lead to a better user experience, and reduce implementation complexity. Cloud IoT connectivity would still be present to connect external devices and services, as well as provide the room with cloud-hosted voice activation skill from a hub rather than each device connecting individually.

In an example use case, assume there is a hospital workspace where doctors and nurse collaborate. With use of IoT, the environment may be a smart environment with the ability to track doctors and nurses. In such an IoT enabled workspace, the workspace experience can be enhanced to handle critical issues.

Along these lines, an application that monitors a patient in an ICU is monitored on various aspects—heart rate, blood pressure, saturation level, glucose level, etc. An application collects this data and sends the data to a centralized cloud service. Since such applications are generally run on thin clients with low computation capacity, analytics is performed on a centralized service. Also, the cloud service has the knowledge of the entire hospital workspace, and co-relate diverse information.

Using pre-fetched simplified actionable analytics, critical issues can be handled effectively and efficiently. The centralized analytics service monitors the IoT deployment and applications, as a whole and learns various actionable insights. If prediction for a given counter is close to the actionable range, it will derive a dynamic rule and push that rule to the specific broker/edge device. This rule is self-contained and will be able to guide broker for a specific action for a delta time ($\Delta t$), if the counter for which this rule was generated matches the rule criteria.

For instance, an analytics service may run an anomaly detection algorithm and learn patterns for a particular counter. At a given time t, it learns that for a duration $\Delta t$, any data point above a line segment AB or below a line segment CD would be an anomaly. Furthermore, the associated action may be to shut down the device and alert the administrator immediately. Hence, it drives a rule as follows If $$y>m1x+c1$$

Or $$y<m2x+c2$$

then execute the action

It should be understood that m1 and m2 are slopes and c1 and c2 are intercepts on the y-axis by line AB and CD respectively.

Below are example actionable rule details. The following may be part of pre-fetched actionable rules.

1. Rules (above example)
2. Action and applicable parameters
3. Clients on which this rule is applicable
4. Validity: Time till which this rule needs to be respected ($\Delta t$)

Steps:
1. Analytics service continuously monitors the data feed for each edge node.
2. Analytics service learns the patterns and predicts the possible values for next $\Delta t$ unit times
3. If any predicted value combined with other predicted counter values are close to actionable range:
4. Generate dynamic simplified analytical rules for each affected node
5. Transfer these simplified analytical rules and associated actions and validity time ($\Delta t$) to designated nodes.

In the context of a work hub and/or smart conferencing, suppose that a smart conferencing room and work hub communicate with the mobile devices of users in the meeting room and the other local IoT devices in the meeting room using beacons, wifi, wifi direct etc.

In such an environment, if it is possible to adjust the volume, brightness of the screen etc., based the preferences of the people in the room automatically; it would provide better user experience.

With an edge based approach, if some simplified rules/analytics are pre-fetched to the edge. The work hub now can take decision based on the local data available rather than reaching out to cloud to make every decision.

Moreover, suppose that different users have different preferences such as display resolution, volume, brightness, etc., while running some application. This information is inferred from multiple meetings on different meeting rooms that is collected by multiple work hubs, and sent to the cloud for analytics. The cloud can perform analytics based on the user preference, designation, location, time of day, etc., and determine a set of preference based on different groups of user. Now after the global analysis, based on the users whose presence is sensed in the meeting room, local information can pre-fetched to the edge (workspace hub). Now based on the user who is currently active in the conference, his choice of preference, can be quickly delivered without multiple round trip times to the cloud.

The following is a sample workflow in such environment:
A work hub collects and sends user preferences from multiple places at different times.
Cloud performs analytics to understand the user preferences.
A work Hub identifies the users in a meeting room.
User preferences for the various user in the meeting room, can be pre-fetched.
Based on the active user in the meeting, the work hub (edge) takes smart decision for user preference.
Cloud gets the summary of actions/user preference taken the work hub to continue process the data for analytics.

In a hospital workspace and in accordance with certain embodiments, suppose that patient A is being monitored and the data is collected by an application on his device. This application sends data to a centralized server. The centralized server also sends this data to patient's doctor's device. Also, the analytics service running on the server closely monitors for anomalies in the data collected. In this healthcare workspace, let the service be aware of the location of doctors and nurses and their profile. The location could be learnt using beacons that communicate/detect mobile devices like mobile phone using Bluetooth low energy technology. When the centralized server detects potential anomaly condition, it sends the learning model, patient file, and action rules to patient's nearest doctor. The application on doctor's device connects to patient's application and they start communicating directly. Application running on doctor's device uses the model that it obtained to monitor patient's data. Now the anomaly is detected on the edge device (doctor's device) based on the pre-fetch simplified analytics model, which notifies the doctor with the patient's file and condition. Given the Patient info is already loaded, he can quickly investigate the critical issue. Such modifications and enhancements are intended to belong to various embodiments of the disclosure.

What is claimed is:
1. A method of deploying analytics to a computerized edge device, the method comprising:
receiving, by processing circuitry, data from the computerized edge device, the data being conveyed to the processing circuitry through the computerized edge device from a set of sensors disposed at a particular location;

performing, by the processing circuitry, analytics on the data to identify a set of edge device rules that defines a set of edge device actions for the computerized edge device to carry out in response to a set of predefined conditions sensed by the set of sensors disposed at the particular location;

providing, by the processing circuitry, a command to the computerized edge device, the command including the identified set of edge device rules; and directing, by the processing circuitry, the computerized edge device to operate in accordance with the set of edge device rules after a specified amount of time;

wherein the processing circuitry resides in a central server constructed and arranged to communicate with a plurality of edge devices;

wherein providing the command including the identified set of edge device rules includes:

preloading the identified set of edge device rules from the central server into the computerized edge device for use by the computerized edge device after waiting the specified amount of time; and wherein directing the computerized edge device to operate includes:

directing the computerized edge device to use the identified set of edge device rules in place of a previous set of edge device rules after waiting the specified amount of time, the identified set of edge device rules including at least one new edge device rule that is not in the previous set of edge device rules, the identified set of edge device rules changing operation of the computerized edge device after the specified amount of time.

2. A method as in claim 1 wherein performing the analytics on the data to identify the set of edge device rules includes:

dynamically deriving a new edge device rule based on the data received from the computerized edge device.

3. A method as in claim 2 wherein dynamically deriving the new edge device rule includes:

generating, as the new edge device rule, (i) a set of threshold criteria and (ii) an action based on applying analytics to the data, the command directing the computerized edge device to perform the action in response to detecting satisfaction of the set of threshold criteria at the particular location during a time window that starts after the specified amount of time.

4. A method as in claim 3 wherein providing the command to the computerized edge device occurs at a first time; and wherein the command identifies (i) the specified amount of time and (ii) that the new edge device rule becomes effective after the computerized edge device receives the new edge device rule and waits the specified amount of time.

5. A method as in claim 4 wherein the computerized edge device, in response to receipt of the command, replaces an existing edge device rule with the new edge device rule after the computerized edge device receives the new edge device rule and waits the specified amount of time.

6. A method as in claim 3 wherein receiving the data from the computerized edge device includes:

acquiring, as the data, measurements that were sensed by the set of sensors and cached by the computerized edge device before being periodically transmitted to the processing circuitry through a computerized network.

7. A method as in claim 6 wherein the measurements include a set of current values measured by at least one sensor of the set of sensors and a location identifier that identifies the particular location from a plurality of other different locations; and wherein the method further comprises:

providing other commands to other computerized edge devices residing at the other different locations to concurrently adapt operation of the other computerized edge devices residing at the other different locations.

8. A method as in claim 3 wherein the set of threshold criteria defines an actionable range, and wherein the new edge device rule specifies a particular action to be performed by the computerized edge device in response to the set of sensors indicating that a set of criteria sensed by the set of sensors currently falls within the actionable range defined by the set of threshold criteria.

9. A method as in claim 8 wherein the action includes pre-fetching a set of electronic files from a file server and providing access to the set of electronic files via the computerized edge device.

10. A method as in claim 8 wherein the action includes outputting an alert from the computerized edge device.

11. A method as in claim 8 wherein the action includes shutting down a client device that is controlled by the computerized edge device.

12. A method as in claim 8 wherein the action includes accessing a set of user preferences and adjusting operation of a client device that is controlled by the computerized edge device based on the set of user preferences.

13. A method as in claim 3 wherein providing the directing the computerized edge device includes:

configuring the computerized edge device to wait at least five minutes after the computerized edge device receives the command before operating in accordance with the set of edge device rules.

14. A method as in claim 3, further comprising:

prior to receiving the data from the computerized edge device, creating a repository of information gathered from multiple computerized edge devices, and applying analytics to the repository of information to form a set of data structures representing predicted outcomes.

15. A method as in claim 14 wherein deriving the new edge device rule includes:

in response to satisfaction of a set of threshold criteria at the particular location during a future time window, generating, as the new edge device rule, an instruction to perform a particular action to address a possible predicted outcome formed by applying the analytics to the repository of information.

16. A method as in claim 1 wherein the previous set of edge device rules specifies a first set of environmental conditions for the computerized edge device;

wherein the identified set of edge rules specifies a second set of environment conditions for the computerized edge device; and wherein the directing the computerized edge device to use the identified set of edge device rules in place of a previous set of edge device rules at the effective time includes:

causing the computerized edge device to provide the second set of environmental conditions in place of the first set of environmental conditions after waiting the specified amount of time.

17. A method as in claim 1 wherein the previous set of edge device rules specifies a first set of medical conditions for processing by the computerized edge device;
wherein the identified set of edge rules specifies a second set of medical conditions for processing by the computerized edge device; and
wherein the directing the computerized edge device to use the identified set of edge device rules in place of a previous set of edge device rules at the effective time includes:
causing the computerized edge device to process the second set of medical conditions in place of the first set of medical conditions after waiting the specified amount of time.

18. An electronic apparatus, comprising:
a communications interface;
memory; and
control circuitry coupled to the communications interface and the memory, the memory storing instructions that, when carried out by the control circuitry, cause the control circuitry to:
receive data from a computerized edge device through the communications interface, the data being conveyed through the computerized edge device from a set of sensors disposed at a particular location,
perform analytics on the data to identify a set of edge device rules that defines a set of edge device actions for the computerized edge device to carry out in response to a set of predefined conditions sensed by the set of sensors disposed at the particular location, and
provide a command to the computerized edge device through the communications interface, the command including the set of edge device rules; and
direct the computerized edge device to operate in accordance with the set of edge device rules after a specified amount of time;
wherein the electronic apparatus operates as a central server constructed and arranged to communicate with a plurality of edge devices through the communications interface;
wherein the control circuitry, when providing the command including the identified set of edge device rules, is constructed and arranged to:
preload the identified set of edge device rules from the central server into the computerized edge device for use by the computerized edge device after waiting the specified amount of time; and
wherein the control circuitry, when directing the computerized edge device to operate, is constructed and arranged to:
direct the computerized edge device to use the identified set of edge device rules in place of a previous set of edge device rules after waiting the specified amount of time, the identified set of edge device rules including at least one new edge device rule that is not in the previous set of edge device rules, the identified set of edge device rules changing operation of the computerized edge device after the specified amount of time.

19. An electronic apparatus as in claim 18 wherein the control circuitry, when performing the analytics on the data to identify the set of edge device rules, is constructed and arranged to:
dynamically derive a new edge device rule based on the data received from the computerized edge device.

20. An electronic apparatus as in claim 19 wherein the control circuitry, when dynamically deriving the new edge device rule, is constructed and arranged to:
generate, as the new edge device rule, (i) a set of threshold criteria and (ii) an action based on applying analytics to the data, the command directing the computerized edge device to perform the action in response to detecting satisfaction of the set of threshold criteria at the particular location during a time window that starts after the specified amount of time.

21. A computer program product having a non-transitory computer readable medium that stores a set of instructions to deploy analytics to a computerized edge device; the set of instructions, when carried out by computerized circuitry, causing the computerized circuitry to perform a method of:
receiving data from the computerized edge device, the data being conveyed through the computerized edge device from a set of sensors disposed at a particular location;
performing analytics on the data to identify a set of edge device rules that defines a set of edge device actions for the computerized edge device to carry out in response to a set of predefined conditions sensed by the set of sensors disposed at the particular location;
providing a command to the computerized edge device, the command (i) including the identified set of edge device rules and (ii) directing the computerized edge device to operate in accordance with the set of edge device rules after a specified amount of time;
wherein the computerized circuitry resides in a central server constructed and arranged to communicate with a plurality of edge devices;
wherein providing the command including the identified set of edge device rules includes:
preloading the identified set of edge device rules from the central server into the computerized edge device for use by the computerized edge device after waiting the specified amount of time; and
wherein directing the computerized edge device to operate includes:
directing the computerized edge device to use the identified set of edge device rules in place of a previous set of edge device rules after waiting the specified amount of time, the identified set of edge device rules including at least one new edge device rule that is not in the previous set of edge device rules, the identified set of edge device rules changing operation of the computerized edge device after the specified amount of time.

22. A computer program product as in claim 21 wherein the computerized edge device automatically responds to the command by (i) waiting the specified amount of time and (ii) after waiting the specified amount of time, starting operation in accordance with the set of edge device rules.

* * * * *

UNITED STATES PATENT AND TRADEMARK OFFICE
CERTIFICATE OF CORRECTION

PATENT NO. : 11,075,813 B2  
APPLICATION NO. : 16/009503  
DATED : July 27, 2021  
INVENTOR(S) : Bhat et al.

Page 1 of 1

It is certified that error appears in the above-identified patent and that said Letters Patent is hereby corrected as shown below:

In the Claims

Column 20, Line 33, cancel the text "providing the".

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*